Feb. 7, 1928.

1,658,488

M. LATOUR

HIGH FREQUENCY ALTERNATOR

Filed Sept. 1, 1921

INVENTOR
MARIUS LATOUR
BY Ira J Adams
ATTORNEY

Patented Feb. 7, 1928.

1,658,488

UNITED STATES PATENT OFFICE.

MARIUS LATOUR, OF PARIS, FRANCE, ASSIGNOR TO LATOUR CORPORATION, OF JERSEY CITY, NEW JERSEY, A CORPORATION OF DELAWARE.

HIGH-FREQUENCY ALTERNATOR.

Application filed September 1, 1921, Serial No. 497,615, and in France August 10, 1915.

(GRANTED UNDER THE PROVISIONS OF THE ACT OF MARCH 3, 1921, 41 STAT. L., 1313.)

Figure 2:
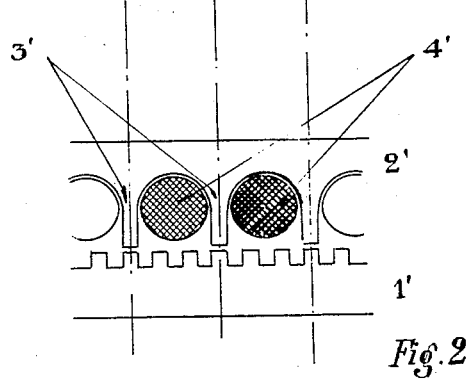

The present invention relates to improvements in high-frequency alternators comprising a rotor having laminated teeth but no winding, and aims at overcoming the difficulties met in the lodging of the stator winding when high frequencies are sought by decreasing the polar pitch of such machines. It will be best understood by referring to the accompanying drawing, in which Figure 1 illustrates a usual type of construction of such machines;

Figure 2 illustrates a high-frequency alternator constructed in accordance with the present invention.

Figure 1:
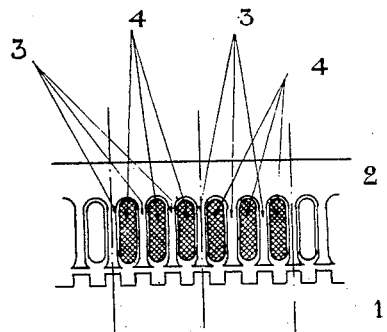

In Figure 1, the rotor 1 comprises only laminated teeth and empty slots. The stator 2 comprises a number of teeth 3 having, at the air-gap, a width equal to that of the rotor teeth. The stator 2 also comprises a number of slots 4 to accommodate the stator winding, a portion of which is shown in cross-section.

As is well-known, the magnetic flux which is embraced by the stator winding varies according to whether the laminated rotor teeth or the empty rotor slots are facing the stator teeth 3, and there is generated, in the stator winding, an electromotive force the frequency of which is determined solely by the number of rotor teeth and the peripheral speed of the rotor.

Therefore, when it is desired to construct a machine of this type for higher frequencies, one must resort to either an increase in peripheral speed or a decrease in polar pitch. Now, for mechanical reasons, it is necessary not to increase the peripheral speed beyond certain limits which are very soon exhausted in high-frequency alternator designing. One must therefore resort to a decrease in the polar pitch. As a consequence of this procedure, following a certain decrease it necessarily results that the stator slot dimensions become too restricted to properly accommodate the stator winding. For example, if we wish to construct a 50,000 cycle alternator having a peripheral speed of 150 meters per second, the resulting space available for both a tooth and a slot is but 3 millimeters. While these dimensions are still admissible for the rotor teeth since the rotor carries no winding, they are inadequate for the stator teeth owing to the fact that the latter have to carry a winding.

Figure 2 illustrates an example of how the present invention proceeds in overcoming this obstacle to increasing the frequency by polar pitch.

In Figure 2, the number of laminated rotor teeth on the rotor 1', as well as the angular span thereof, is the same as that of the rotor 1 of Figure 1. In order to obtain adequate stator winding space, it will be noted, however, that for every group of $p$ rotor teeth bounded by any two dot-and-dash lines vertically joining Figures 1 and 2, a number equal to $(p-n)$ adjacent stator teeth have been omitted in Figure 2. In the specific case illustrated by Figures 1 and 2, $p=3$, and $n=1$. The number of rotor teeth and the peripheral speed remaining the same as in Figure 1, it follows, from what has been stated above, that the frequency will be the same but with this advantage: The stator slot dimensions, and hence the space available for the accommodation of the stator winding, are thereby greatly increased.

Having described my invention, what I claim is:

1. In a dynamo-electric machine, in combination, a rotating element having groups of teeth with $p$ teeth per group, and a stationary element cooperating therewith having groups of teeth with $p-n$ teeth per group, where $p$ is an integer not greater than five, and $n$ is an integer less than $p$, the teeth of both elements being of the same width at the air gap.

2. In a high frequency dynamo-electric machine, a rotor member comprising a plurality of evenly spaced teeth with slots therebetween, a stator member comprising a plurality of evenly spaced teeth with slots therebetween, the teeth of both members having the same width at the air gap, and a winding arranged in said slots, the width of each slot at the air gap in said stator member being at least equal to the combined width of a tooth and a slot on said rotor member, whereby sufficient winding space is provided for said winding.

3. In a high-frequency dynamo-electric machine, a rotor member comprising a plurality of evenly spaced teeth, the frequency of the machine being equal to the product of the number of said teeth and the number of revolutions per second of said rotor, a stator member comprising a plurality of evenly spaced teeth with slots therebetween, the width of said stator teeth being substantially equal to the width of said rotor teeth, and a winding arranged in said stator slots, the number of teeth on said stator member being less than the number of teeth on said rotor member, whereby increased winding space is provided on said stator member for said winding.

In testimony whereof I affix my signature.

MARIUS LATOUR.